US009314987B2

(12) United States Patent
Sato

(10) Patent No.: US 9,314,987 B2
(45) Date of Patent: Apr. 19, 2016

(54) LABEL FORMING APPARATUS AND LABEL FORMING METHOD

(71) Applicants: CASIO ELECTRONICS MANUFACTURING CO., LTD., Iruma-shi, Saitama-Ken (JP); CASIO COMPUTER CO., LTD., Shibuya-ku, Tokyo (JP)

(72) Inventor: Masaru Sato, Kodaira (JP)

(73) Assignees: CASIO ELECTRONICS MANUFACTURING CO., LTD., Saitama-Ken (JP); CASIO COMPUTER CO., LTD., Tokyo (JP)

( * ) Notice: Subject to any disclaimer, the term of this patent is extended or adjusted under 35 U.S.C. 154(b) by 137 days.

(21) Appl. No.: 14/221,698

(22) Filed: Mar. 21, 2014

(65) Prior Publication Data

US 2014/0295056 A1 Oct. 2, 2014

(30) Foreign Application Priority Data

Mar. 29, 2013 (JP) ................................ 2013-074068

(51) Int. Cl.

*B29C 65/48* (2006.01)
*B32B 38/14* (2006.01)
*B32B 41/00* (2006.01)

(Continued)

(52) U.S. Cl.

CPC ...................................... *B31D 1/027* (2013.01)

(58) Field of Classification Search

USPC .......... 156/350, 351, 363, 384, 387, 537, 538
See application file for complete search history.

(56) References Cited

U.S. PATENT DOCUMENTS 3,736,867 A * 6/1973 Bates ..................... G06K 1/121 101/269
4,411,194 A * 10/1983 Davidson, Jr. ............ B41F 7/08 101/216
5,248,993 A * 9/1993 Oshino .................... B41J 2/355 346/134

(Continued)

FOREIGN PATENT DOCUMENTS

JP 08-167544 A 6/1996
JP 09183427 A 7/1997

(Continued)

OTHER PUBLICATIONS

English Abstract of JP 2010-173157 (Dec. 12, 2015).*

(Continued)

*Primary Examiner* — Sing P Chan
(74) *Attorney, Agent, or Firm* — Holtz, Holtz & Volek PC

(57) ABSTRACT

A label forming apparatus includes a film forming device and a printer. The film forming device includes a transportation mechanism that transports a base sheet having a print surface, a storage unit that stores a position of the film based on prescribed positions of markers, a film forming unit that forms the film on the print surface, and a marker forming unit that forms the markers at the prescribed marker positions on the print surface. The printer includes a marker position detector provided on the downstream side of the film forming device to detect the markers, an image layer forming unit provided on the downstream side of the marker position detector to form an image layer on the film, and a second controller coupled with the marker position detector and the image layer forming unit to form the image layer on the film by controlling the image layer forming unit.

4 Claims, 7 Drawing Sheets

(51) Int. Cl.
*B65C 9/40* (2006.01)
*B31D 1/02* (2006.01)

(56) References Cited

U.S. PATENT DOCUMENTS

| | | | | | |
|---|---|---|---|---|---|
| 6,006,014 | A * | 12/1999 | Yamaguchi | B41J 3/4075 358/1.18 |
| 7,815,761 | B2 | 10/2010 | Phillips | |
| 8,371,354 | B2 | 2/2013 | Phillips | |
| 9,122,220 | B2 * | 9/2015 | Numazu | G03G 15/5062 |
| 2014/0064747 | A1 * | 3/2014 | Numazu | G03G 15/5062 399/19 |

FOREIGN PATENT DOCUMENTS

| | | | | | |
|---|---|---|---|---|---|
| JP | 2007-283745 | A | | 11/2007 | |
| JP | 2009-226678 | A | | 10/2009 | |
| JP | 2010-032884 | A | | 2/2010 | |
| JP | 2010511545 | A | | 4/2010 | |
| JP | 2010173157 | A | * | 8/2010 | B41J 3/30 |

OTHER PUBLICATIONS

Machine translation of JP 2010-173157 (Dec. 12, 2015).*
Machine translation of JP 2007-283745 (Dec. 12, 2015).*
Japanese Office Action dated Jul. 15, 2014 issued in counterpart Japanese Application No. 2013-074068.

* cited by examiner

LABEL FORMING APPARATUS AND LABEL FORMING METHOD

CROSS-REFERENCE TO RELATED APPLICATION

This application is based upon and claims the benefit of priority from prior Japanese Patent Application No. 2013-074068, filed on Mar. 29, 2013, which is incorporated herein by reference in its entirety.

BACKGROUND OF THE INVENTION

1. Field of the Invention

The present invention relates to a label forming apparatus and a label forming method for forming a label by printing an image on a film, for example, on a base sheet.

2. Description of the Prior Art

A label forming method for forming a label with a printed design has been known. In such a label forming method, a resin sheet is prepared and a design is printed thereon using an ink, etc. to form a label.

Various label forming techniques have been known. In JP2007-283745A, for example, a method and an apparatus for forming a label by an electrophotographic type image forming apparatus using toner has been proposed. In this case, a blade die is not prepared if a label to be formed includes a backside with an adhesive applied thereon. A label base material, a label image, and a sealing material are sequentially formed on a release sheet with adhesive, whereby a label with an arbitrary shape can be formed at a desired timing.

In the above label forming apparatus, however, there has been the following problem. Specifically, since the film formation and the transfer of toner are carried out in separate processes, the positions on the film where the toner is transferred may be shifted. To transfer toner accurately to predetermined positions on the film, therefore, it is necessary for the film forming apparatus and the toner transferring apparatus to be integrated and formed with a high mechanical accuracy.

SUMMARY OF THE INVENTION

It is an object of the present invention to provide a label forming apparatus and a label forming method capable of accurately forming, on a predetermined position of a first pattern such as a film, a second pattern such as a design without requiring a high mechanical accuracy for the entire apparatus.

To solve the above problem and to achieve the object, a label forming apparatus and a label forming method according to an embodiment of the present invention are configured as follows.

The label forming apparatus according to an embodiment of the present invention includes a first pattern forming device and a second pattern forming device. The first pattern forming device includes a first transportation mechanism configured to transport a base sheet having a print surface thereon, a position storage unit configured to store a first pattern forming position based on a prescribed marker position and first pattern data, a first pattern forming unit configured to form a first pattern on the first pattern forming position on the print surface, and a marker forming unit configured to form a marker on the prescribed marker position on the print surface. The second pattern forming device includes a second transportation mechanism configured to transport the base sheet having the first pattern and the marker formed on the print surface thereof, a marker position detector provided on the downstream side of the first pattern forming unit and the marker forming unit and configured to detect a marker detection position where the marker is formed by the marker forming unit, a second pattern forming unit provided on the downstream side of the marker position detector and configured to form a second pattern on the first pattern, and a controller configured to control the position where the second pattern is formed by the second pattern forming unit, based on a first pattern determination position where the position of the first pattern is determined from the prescribed marker position and the detected marker position detected by the marker position detector.

DESCRIPTION OF THE PREFERRED EMBODIMENTS

Embodiments of the present invention will be described below in detail with reference to the accompanying drawings.

Figure 1:
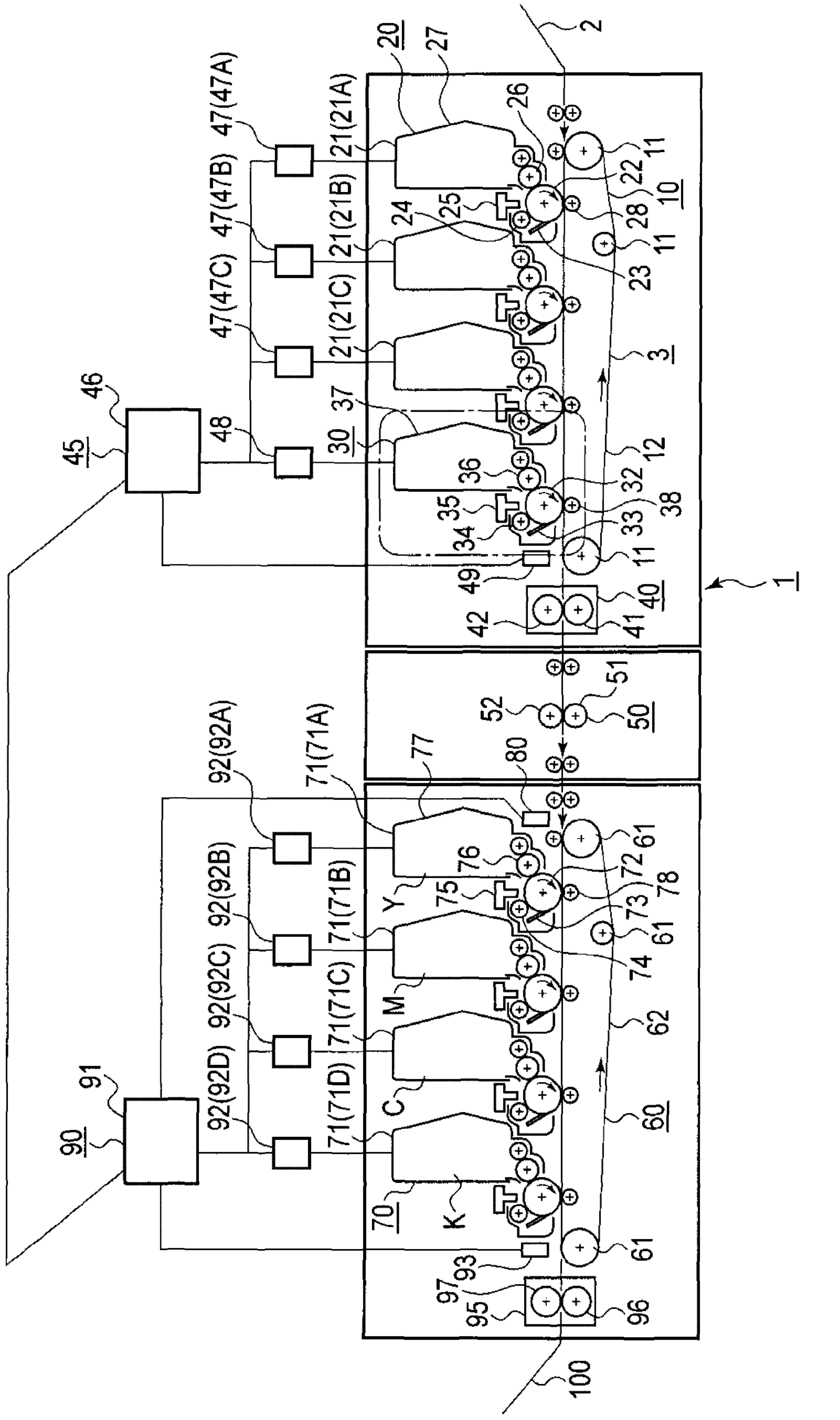
FIG. 1 is an explanatory view illustrating an internal structure of a label forming apparatus according to an embodiment of the present invention.
Figure 2:
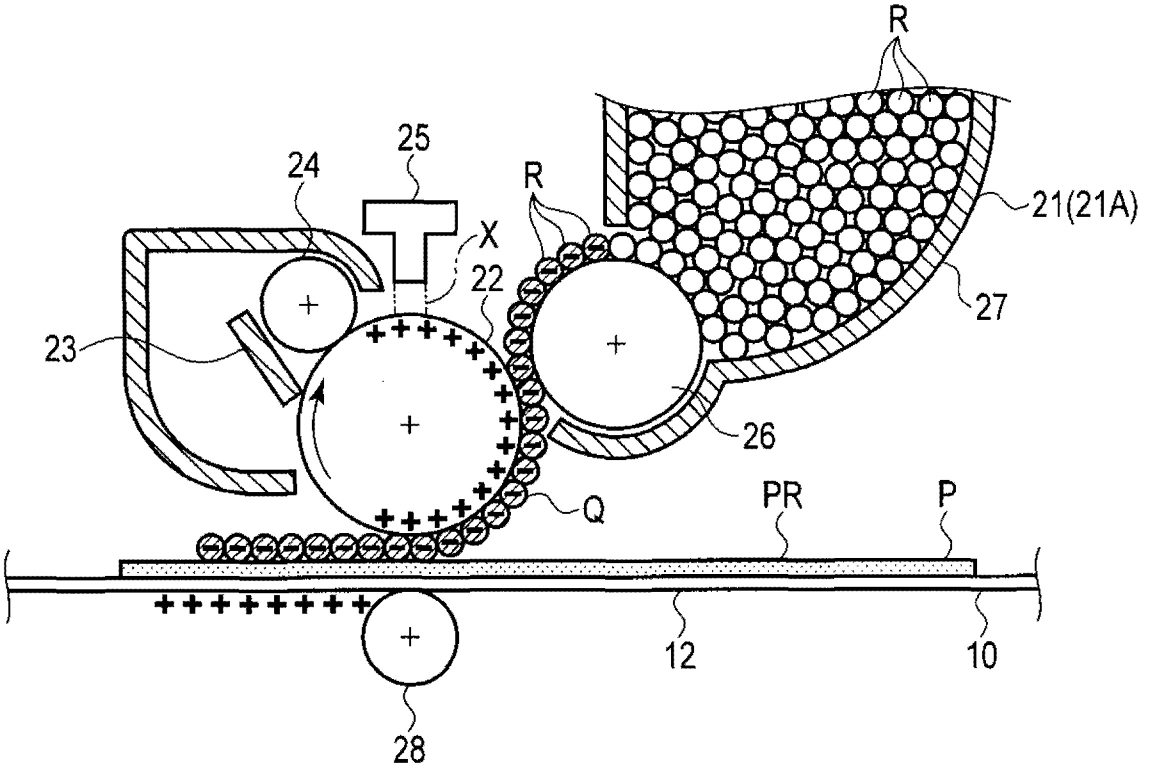
FIG. 2 is an explanatory view illustrating a process of transferring resin on a base sheet.
Figure 3:
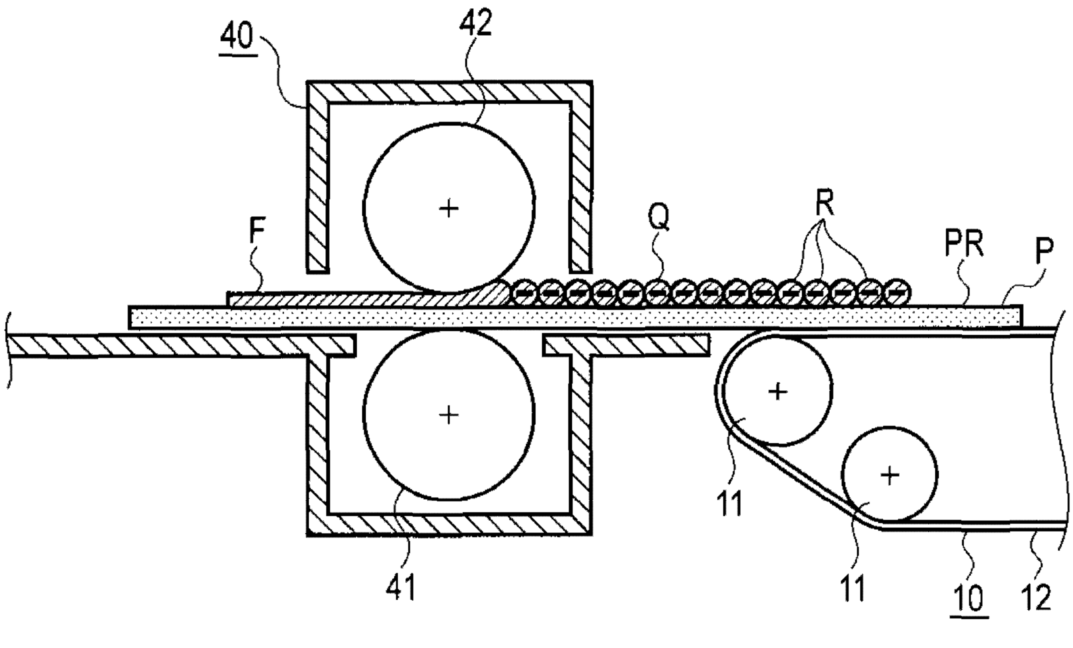
FIG. 3 is an explanatory view illustrating a process of fixing the resin transferred on the base sheet.

FIG. 1 is an explanatory view illustrating an internal structure of a label forming apparatus 1 according to an embodiment of the present invention. FIG. 2 is an explanatory view illustrating a process of transferring resin by the label forming apparatus 1. FIG. 3 is an explanatory view illustrating a process of fixing the resin by the label forming apparatus 1. FIGS. 4 to 15 are explanatory views illustrating a label forming process of the label forming apparatus 1. In the description below, P indicates a base sheet, and R, S, and T indicate first, second, and third resin powders, respectively. A base sheet P used herein includes an adhesive layer P2 and a coating layer P3 laminated on a releasing sheet P1 having a low surface energy and a good releasing characteristic. The first to third resin powders R, S, and T are thermoplastic resins used to create a film (first pattern) F, a marker J, and an image layer (second pattern) W.

In the following description, a surface of the base sheet P on the side of the adhesive layer P2 and the coating layer P3 is referred to as a print surface PR. The film F with the image layer W formed thereon is referred to as a label L.

The label forming apparatus 1 forms the label L while transporting the base sheet P. As illustrated in FIG. 1, the label forming apparatus 1 includes a base sheet feeder 2 to supply a base sheet P, a transportation mechanism 3 to transport the base sheet P, a film forming device (first pattern forming device) 20 and a printer (second pattern forming device) 70 provided above the transportation mechanism 3, and a paper discharger 100 in which the base sheet P is located in the downstream side of the transportation mechanism 3.

The transportation mechanism 3 includes a first transportation mechanism 10, a relay transportation mechanism 50, and a second transportation mechanism 60. A film forming device 20 is located above a first transportation belt 12, which will be described below, of the first transportation mechanism 10. The printer 70 is located above a second transportation belt 62, which will be described below, of the second transportation mechanism 60.

The first transportation mechanism 10 receives the base sheet P from the base sheet feeder 2. The first transportation mechanism 10 includes a plurality of driving rollers 11 and a first transportation belt 12 that runs over the driving rollers 11 and transfer rollers 28 which will be described below. The base sheet P is placed on the first transportation belt 12 for transportation.

Three film forming devices 20 are provided in a transportation direction of the first transportation belt 12. The film forming devices 20 include film forming units (first pattern forming portions) 21 (21A, 21B, and 21C) that form a film F on the base sheet P, a marker forming unit (a marker forming portion) 30 provided on the downstream side of the film forming units 21, a first controller 45, a first concentration sensor 49 that measures the concentrations of a first resin powder R and a second resin powder S, and a film fixing unit 40 used to fix the first resin powder R and the second resin powder S on the base sheet P.

In the following description, the film forming units 21 are referred to as the film forming units 21A, 21B, and 21C, respectively, which are provided sequentially from the upstream side.

The film forming unit 21A includes a photosensitive drum 22 having a photosensitive material formed on an outer surface thereof, a doctor sheet 23 arranged to circumferentially surround the outer surface of the photosensitive drum 22, a charging roller 24, an exposing head 25 formed by an LED head, a developing roller 26, a resin powder tank 27 which is filled with the first resin powder R and supplies the powder to the developing roller 26, and a transfer roller 28 provided on the underside of the first transportation belt 12 to pinch the base sheet P with the photosensitive drum 22 and to transfer the first resin powder R on the base sheet P.

The film forming units 21B and 21C are configured similarly to the film forming unit 21A. The resin powder tanks 27 of the film forming units 21A, 21B, and 21C, which have been filled with the first resin powder R, may be used according to the necessary thickness of the film. For example, the three tanks may be filled with the same first resin powder R selected from among transparent, white, and fluorescent colors, etc. In this case, a resulting film thickness would be the largest when the three tanks are used, while the film would be thinner if one tank is used. Alternatively, a combination of the above resin powder and yellow (Y), magenta (M), and cyan (C) resin powders may be used depending on the usage of the label to apply various colors and designs on the film.

The marker forming unit 30 is configured similarly to the film forming unit 21. Specifically, the marker forming unit 30 includes a photosensitive drum 32, a doctor sheet 33, a charging roller 34, an exposing head 35, a developing roller 36, a resin powder tank 37, and a transfer roller 38. The resin powder tank 37 is filled with a second resin powder S that is used to form a marker J, instead of the first resin powder R in the film forming units 21.

Figure 8:
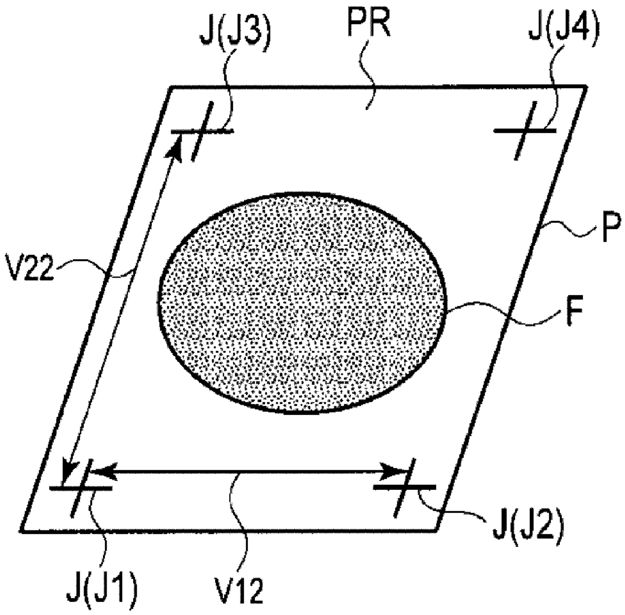
FIG. 8 is a perspective view illustrating the base sheet on which the film resin and the marker resin have been fixed.

The marker J is shaped like a cross, for example, as illustrated in FIG. 8, the cross being formed by a vertical line running perpendicularly to a direction in which the first transportation belt 12 is moved, and a parallel line running in parallel with the direction in which the first transportation belt 12 is moved.

The first controller 45 includes a first transfer controller 46, film formation instructing units 47, and a marker formation instructing unit 48. The first transfer controller 46 is coupled with the first concentration sensor 49. The film formation instructing units 47 are coupled with the first transfer controller 46 and the film forming units 21. The marker formation instructing unit 48 is coupled with the first transfer controller 46 and the marker forming unit 30. The first transfer controller 46 also has a function as a position storage device that stores a position where the film F is formed. In the following description, the film formation instructing units 47 are referred to as film formation instructing units 47A, 47B, and 47C arranged sequentially from the upstream side. Specifically, the film formation instructing units 47A, 47B, and 47C are coupled with the film forming units 21A, 21B, and 21C, respectively.

The film formation instructing units 47A, 47B, and 47C control transfer of the first resin powder R onto the base sheet P at the film forming units 21A, 21B, and 21C in response to a signal supplied from the first transfer controller 46.

The marker formation instructing unit 48 controls transfer of the second resin powder S onto the base sheet P at the marker forming unit 30 in response to a signal supplied from the first transfer controller 46.

The first concentration sensor 49 is provided above the first transportation belt 12 and on the downstream side of the film forming units 21 and the marker forming unit 30. The first concentration sensor 49 has a function of measuring the concentrations of the first resin powder R and the second resin powder S.

The first concentration sensor 49 is also used in correction control of misalignment of positional offset during the transfer operation so as to prevent the misalignment between the film forming units 21 (21A, 21B, and 21C) and the marker forming unit 30. This is similar to resist control that is correction control of misalignment of colors in an electrophotographic color image forming apparatus using four consecutive tandem colors. The correction control of positional alignment is also performed, as necessary, similarly in the course of installation or exchange of individual units or resin powder tanks. Such a correction of positional misalignment, therefore, will not be described herein on the assumption that the film forming units 21 and the marker forming unit 30 are positionally aligned with each other during the transfer operation.

The film fixing unit 40 is provided on the downstream side of the first transportation mechanism 10 and includes a pair of fixing rollers 41 and 42. The film fixing unit 40 transports the base sheet P from the first transportation mechanism 10 to the relay transportation mechanism 50, which will be described below. At the same time, the film fixing unit 40 applies heat to the first and second resin powders R and S and fix them on the print surface PR to form the film F and the marker J.

The relay transportation mechanism 50 is arranged between the film fixing unit 40 and the second transportation mechanism 60 described below. The relay transportation mechanism 50 includes a pair of driving rollers 51 and 52 by which the base sheet P supplied from the film fixing unit 40 is transported to the second transportation mechanism 60.

The second transportation mechanism 60 is provided on the downstream side of the relay transportation mechanism 50, from which the base sheet P is supplied. The second transportation mechanism 60 includes a plurality of driving rollers 61 and a second transportation belt 62 running over the driving rollers 61 and transfer rollers 78 which will be described below.

The printer 70 includes a marker position detector (marker position detecting portion) 80 provided above the second transportation belt 62 to detect the position of the marker J on the base sheet P. The printer 70 further includes image layer forming units (toner transfer portions) 71 (71A, 71B, 71C, and 71D). The four image layer forming units 71 are provided on the downstream side of the marker position detector 80 in the transportation direction of the second transportation belt 62 to form the image layer W on the film F. The printer 70 further includes a second controller (control portion) 90 coupled with the marker position detector 80 and the image layer forming units 71, a second concentration sensor 93 coupled with the second controller 90, and an image layer fixing unit 95 used to fix the image layer W on the film F.

The marker position detector 80 is provided between the second transportation belt 62 and the relay transportation mechanism 50. The marker position detector 80 has a function of detecting the position of the marker J on the base sheet P.

The image layer forming units 71 are configured similarly to the film forming units 21. Specifically, each of the image layer forming units 71 includes a photosensitive drum 72, a doctor sheet 73, a charging roller 74, an exposing head 75, a developing roller 76, a resin powder tank 77, and a transfer roller 78. The resin powder tanks 77 are filled with a third resin powder T used to form the image layer W, instead of the first resin powder R in the film forming units 21.

In the following description, the image layer forming units 71 are referred to as image layer forming units 71A, 71B, 71C, and 71D, respectively, from the upstream side. The resin powder tanks 77 of the image layer forming units 71A, 71B, 71C, and 71D are filled with the third resin powder T of yellow (Y), magenta (M), cyan (C), and black (K) resins, respectively.

The second controller 90 includes a second transfer controller 91 coupled with the marker position detector 80, and image layer formation instructing units 92 coupled with the second transfer controller 91 and the image layer forming units 71. In the following description, the image layer formation instructing units 92 will be referred to as image layer formation instructing units 92A, 92B, 92C, and 92D, respectively, from the upstream side. Specifically, the image layer formation instructing units 92A, 92B, 92C, and 92D are coupled with the image layer forming units 71A, 71B, 71C, and 71D, respectively, as in the case where the film formation instructing units 47A, 47B, and 47C are coupled with the film forming units 21A, 21B, and 21C, respectively.

In response to a signal supplied from the second transfer controller 91, the image layer formation instructing units 92A, 92B, 92C, and 92D control the transfer of the third resin powder T to the film F by the image layer forming units 71A, 71B, 71C, and 71D.

The second concentration sensor 93 is provided above the second transportation belt 62 and on the downstream side of the image layer forming units 71. The second concentration sensor 93 has a function of measuring the concentration of the third resin powder T.

Similar to the first concentration sensor 49, the second concentration sensor 93 is also used in correction control of misalignment of positions during the transfer operation so as to prevent the misalignment during the transfer operation of the image layer forming units 71 (71A, 71B, 71C, and 71D). This is similar to the correction control of misalignment of colors in an electrophotographic color image forming apparatus using four consecutive tandem colors. The correction control of positional misalignment is performed as needed in the course of installation or exchange of individual units or resin powder tanks. Such a correction of positional misalignment, therefore, will not be described herein on the assumption that the positions of the units are aligned with each other.

The image layer fixing unit 95 is provided on the downstream side of the second transportation mechanism 60 and includes a pair of fixing rollers 96 and 97. The image layer fixing unit 95 applies heat to the third resin powder T to form the image layer W while transporting the base sheet P supplied from the second transportation mechanism 60 to the paper discharger 100 which will be described below. Specifically, the label L is formed on the base sheet P.

The base sheet P with the label L formed thereon is discharged to the paper discharger 100 provided on the downstream side of the image layer fixing unit 95.

The film forming units 21, the marker forming unit 30, and the image layer forming units 71 are so-called electrophotographic-type resin powder transfer units. The film forming units 21, the marker forming unit 30, and the image layer forming units 71 operate in response to the signals from the film formation instructing units 47, the marker formation instructing unit 48, and the image layer formation instructing units 92, respectively.

The film forming units 21 transfer the first resin powder R on the base sheet P, as illustrated in FIG. 2. The first resin powder R on the base sheet P is fixed as illustrated in FIG. 3. FIG. 2 illustrates a state where the first resin powder R is transferred onto the base sheet P by the film forming unit 21A. The film forming unit 21A transfers the first resin powder R under the control of the first transfer controller 46 via the film formation instructing unit 47A in terms of charging of the photosensitive drum 22 or a process to form a latent image X, which will be described later.

The base sheet P is supplied to the film forming unit 21A located on the upstream side. The photosensitive drum 22 is rotated in the direction of an arrow (clockwise) in FIG. 2. The photosensitive material on the photosensitive drum 22 is charged by the charging roller 24.

Next, the exposing head 25 projects light on the surface of the photosensitive drum 22 and exposes a pattern having an arbitrary shape to divide the surface into an unexposed part and a region of the latent image X having a surface potential difference.

After that, the developing roller 26 is rotated to deposit the first resin powder R, supplied from the resin powder tank 27 while being stirred, on the surface of the photosensitive drum 22.

The first resin powder R is charged with static electricity by the stirring and transferred from the developing roller 26 to be deposited on the latent image X on the photosensitive drum 22 to thereby form a transfer layer Q. The base sheet P is then supplied in synchronism with the rotational movement of the transfer layer Q so that the transfer layer Q and the base sheet P enter a position contacting the transfer roller 28 in an overlapping manner.

The base sheet P is pressed by the photosensitive drum 22 and the transfer roller 28 to transfer the transfer layer Q to the base sheet P using a toner adsorption potential applied to the transfer roller 28. After the transfer process, an excess amount of the first resin powder R left on the surface of the photosensitive drum 22 is shaken off by the doctor sheet 23. The film forming units 21 transfer the first resin powder R on the base sheet P as the transfer layer Q by repeating the above-described process from the charging to the removal of the excessive first resin powder R.

The transfer of the first resin powder R is performed similarly in the film forming units 21B and 21C.

As illustrated in FIG. 3, the transfer layer Q and the base sheet P are passed through the film fixing unit 40 where heat and pressure are applied to the first resin powder R, which forms the transfer layer Q, to fuse and harden the powder on the base sheet P. Thus, the film F is formed.

It is noted that the marker forming unit 30 and the image layer forming units 71 also transfer the second resin powder S and the third resin powder T, respectively, onto the base sheet P in a way similar to that illustrated in FIG. 2. The second and third resin powders S and T are fixed by the film fixing unit 40 and the image layer fixing unit 95, respectively, in a way similar to that illustrated in FIG. 3.

A method for forming a label L by the label forming apparatus 1 will be described below.

Figure 4:
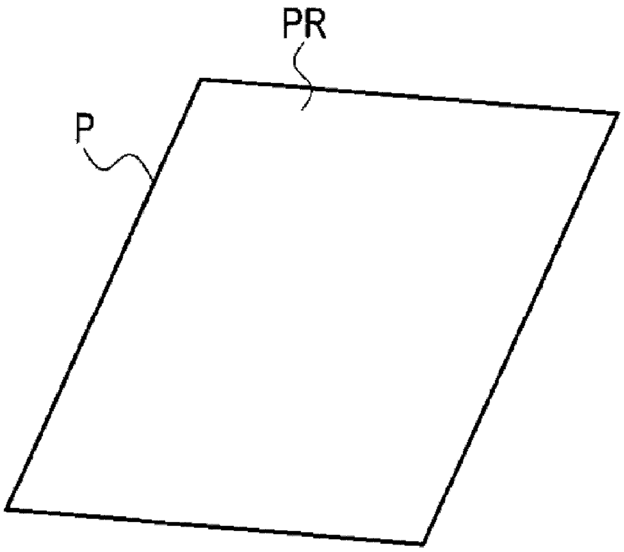
FIG. 4 is a perspective view of the base sheet.
Figure 5:
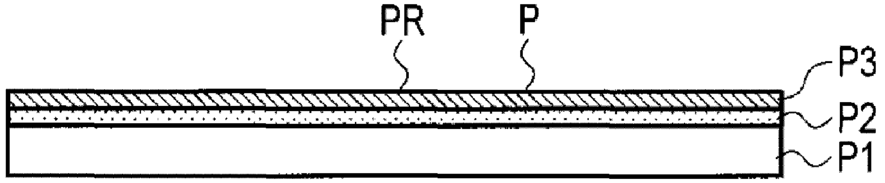
FIG. 5 is a cross-sectional view of the base sheet.

The base sheet P placed on a base sheet feeder 2 is supplied to a first transportation mechanism 10. The base sheet P supplied to the first transportation mechanism 10 is placed and transported on the first transportation belt 12 with the print surface PR facing upward. FIGS. 4 and 5 illustrate the base sheet P.

The first resin powder R, which forms the film F, is transferred to the print surface PR from the film forming units 21 (21A, 21B, 21C) provided along the first transportation belt 12. A film forming position (first pattern forming position) of the film F on the print surface PR is based on a predetermined position (prescribed marker position) U2 on the print surface PR which will be described below, and is also based on shape data, etc. (first pattern data) of the film F. The film forming position is stored in the first transfer controller 46. Specifically, the marker J represents a transfer position on the print surface PR, and based on this position, a position U1 where the film F is formed is defined and stored. The first resin powder R is transferred to this position.

Figure 6:
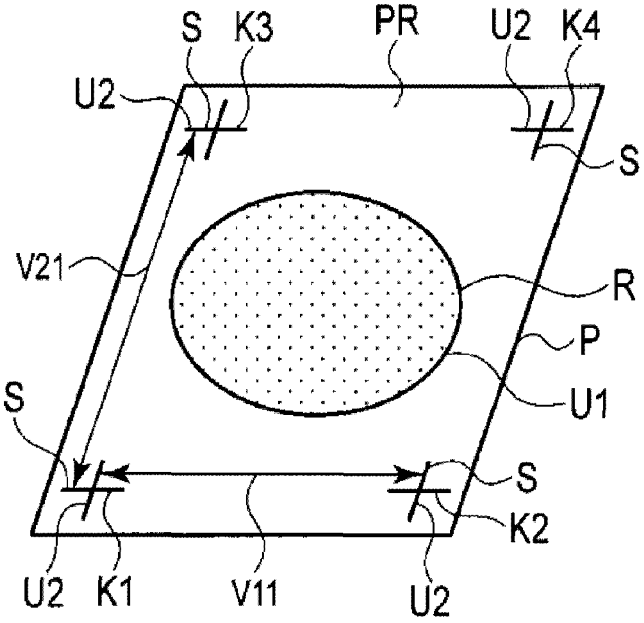
FIG. 6 is a perspective view illustrating the base sheet on which a film resin and a marker resin have been transferred.
Figure 7:
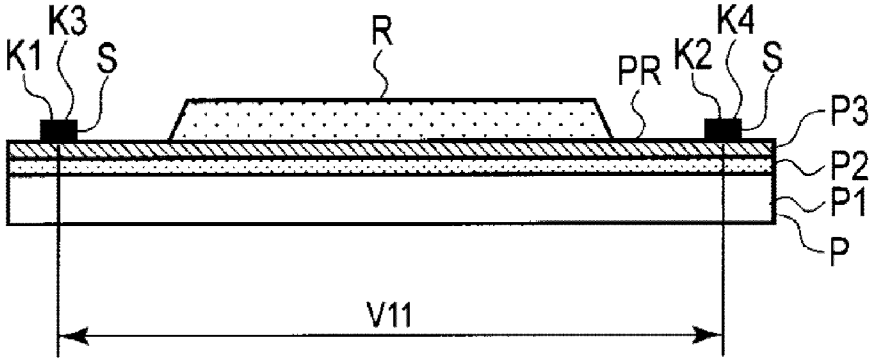
FIG. 7 is a cross-sectional view illustrating the base sheet on which the film resin and the marker resin have been transferred.

After the first resin powder R is transferred, the second resin powder S is transferred to the prescribed positions (prescribed marker positions) U2 on the print surface PR to form the markers J (J1, J2, J3, and J4), as illustrated in FIGS. 6 and 7. In the following description, portions of the second resin powder S that turn into the markers J1, J2, J3, and J4 on the print surface PR will be referred to as markers K1, K2, K3, and K4, respectively.

The markers K1 and K2 are put on the head of the print surface PR in the transportation direction of the first transportation belt 12. The markers K1 and K2 are separated from each other by a measurement V11 in a direction perpendicular to the transportation direction of the first transportation belt 12. The markers K3 and K4 are put on the tail of the print surface PR in the transportation direction of the first transportation belt 12. The markers K3 and K4 are separated from each other by the measurement V11 in a direction perpendicular to the transportation direction of the first transportation belt 12.

The markers K1 and K3, as well as the markers K2 and K4, are separated from each other by a measurement V21. Straight lines running between the markers K1 and K3, and between the markers K2 and K4, respectively, are in parallel with the transportation direction of the first transportation belt 12.

Figure 9:
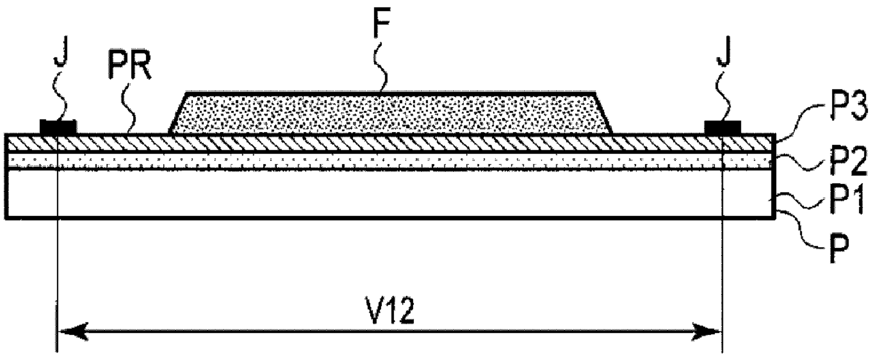
FIG. 9 is a cross-sectional view illustrating the base sheet on which the film resin and the marker resin have been fixed.

After the transfer of the first and second resin powders R and S, the film F and the markers J are formed on the print surface PR by the film fixing unit 40 as illustrated in FIGS. 8 and 9.

The first transfer controller 46 transmits, to the second transfer controller 91, information on the position of the film F relative to the markers J, and on the above-mentioned measurements V11 and V21.

Next, the base sheet P is transported via the relay transportation mechanism 50 to the printer 70 where the image layer W including designs and letters are formed.

The base sheet P transported via the relay transportation mechanism 50 is supplied to the second transportation mechanism 60. The base sheet P is supplied to the second transportation mechanism 60, with the print surface PR facing upward on the second transportation belt 62.

Figure 10:
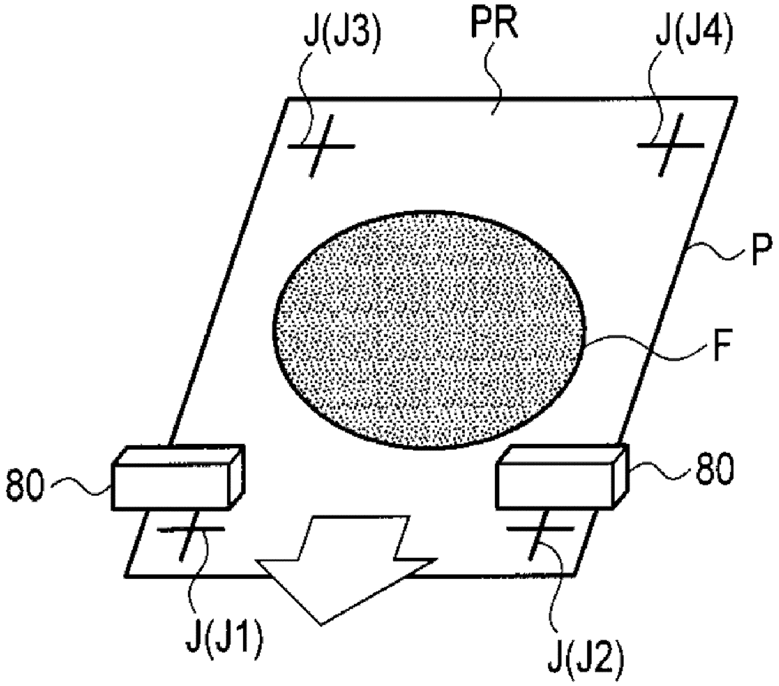
FIG. 10 is a perspective view illustrating a marker detecting process.
Figure 11:
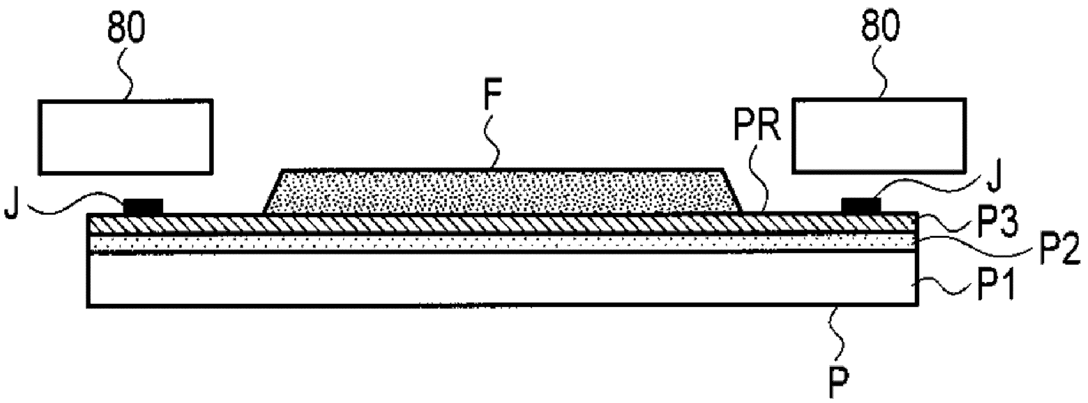
FIG. 11 is a cross-sectional view illustrating the marker detecting process.

The marker position detector 80 detects the positions of the markers J of the base sheet P placed on the second transportation belt 62, as illustrated in FIGS. 10 and 11. By using the information regarding the positions of the markers J detected by the marker position detector 80, the position of the film F relative to the markers J transmitted from the first transfer controller 46, and the above-described measurements V11 and V21, the second transfer controller 91 controls the transfer positions and the shape of the third resin powder T to be transferred by the image layer forming units 71 on the print surface PR. The control method will be described below.

The marker position detector 80 detects all positions of the markers J1, J2, J3, and J4. As described above, the position of the film F relative to the markers J has been stored. By detecting the positions of the markers J, therefore, the position of the film F can also be detected. For example, by detecting the markers J1 and J2 or the markers J1 and J3, it is possible to detect the degree of inclination of the film F relative to the transporting direction of the second transportation belt 62 on the same plane.

In addition, there is a case where the base sheet P expands and contracts during the fixing operation of the film F. In this case, the size of the film F and the positions of the markers J change. Since the marker position detector 80 detects all positions of the markers J1, J2, J3, and J4, a measurement V12 between the markers J1 and J2 and a measurement V22 between the markers J1 and J3 can also be detected during the detection of the markers J. By comparing the measurements V12 and V22 with the measurements V11 and V21 obtained during the transfer of the markers J, the expansion and contraction of the base sheet P, i.e., a change in size of the film F can be detected.

With respect to the measurements V11 and V12, for example, the measurement has been multiplied by V12/V11 between the transfer of the second resin powder S and the detection of the positions of the markers J1, J2 by the marker position detector 80. The size of the film F can also be estimated to have been multiplied by V12/V11 in the direction of the measurement V12 of the film F.

Figure 12:
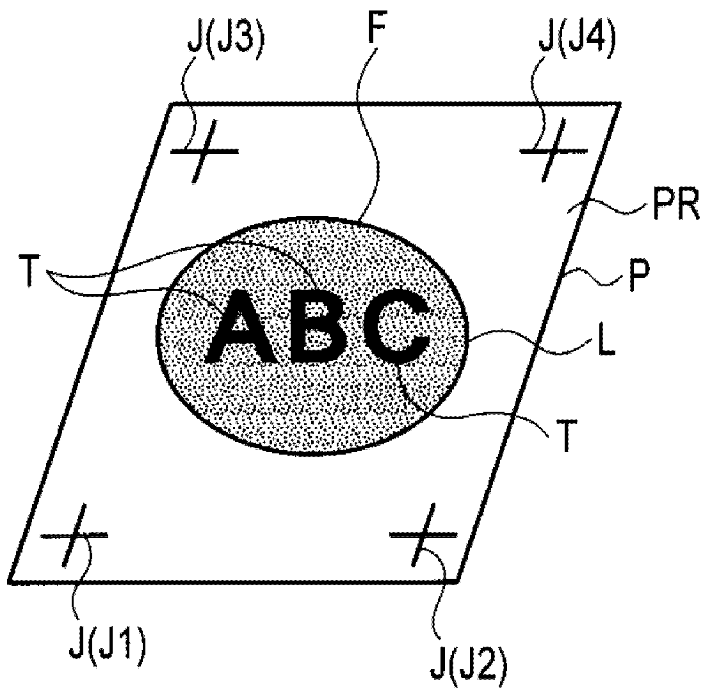
FIG. 12 is a perspective view illustrating the film resin on which an image forming resin has been transferred.
Figure 13:
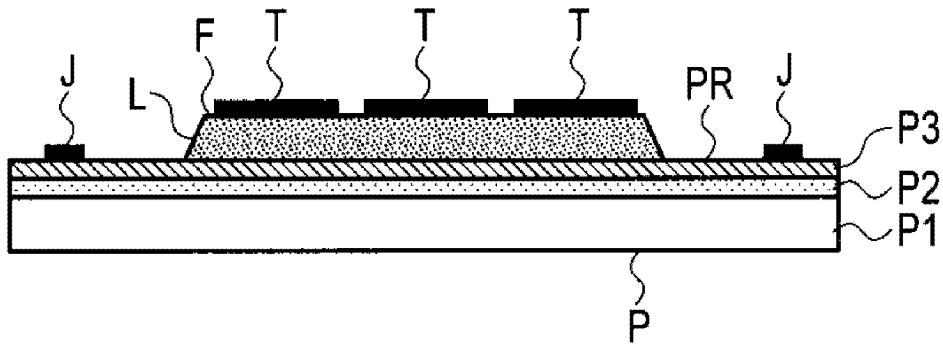
FIG. 13 is a cross-sectional view illustrating the film resin on which the image forming resin has been transferred.

According to the detected position and size of the film F, as well as the information on the degree of inclination of the film F in the same plane in the transportation direction of the second transportation belt 62, the second transfer controller 91 controls the image layer forming units 71 via the image layer formation instructing units 92 to transfer the third resin powder T over a predetermined range at a predetermined position on the film F, as illustrated in FIGS. 12 and 13. The control of the image layer forming unit 71 is more particularly the controlling of the amount of light or timing of exposure of the exposing head 75 to control the position and shape of the latent image X on the photosensitive drum.

If the distance between the marker position detector 80 and the image layer forming unit 71A is short, the film F is likely to have already passed below the image layer forming unit 71A when the detection of all positions of the markers J1, J2, J3, and J4 is completed. In this case, the transfer of the third resin powder T is carried out under the control of the second transfer controller 91 by using the information on the detected positions of the markers J1 and J2 alone that are located on the head of the transportation direction.

Alternatively, when the detection of all positions of the markers J1, J2, J3, and J4 has been completed, the second transportation belt 62 is operated in a reverse direction until the base sheet P is moved from below the image layer forming unit 71A to the side of the marker position detector 80. At this time, the second transportation belt 62 is returned to operate in a forward direction and start transferring the third resin powder T. It is possible to determine whether the film F is located below the image layer forming unit 71A, because the position of the film F is being detected.

After that, the image layer fixing unit 95 is used to fix the third resin powder T on the film F to form the image layer W. The label L is thus completed. The label L is discharged to the paper discharger 100.

Figure 14:
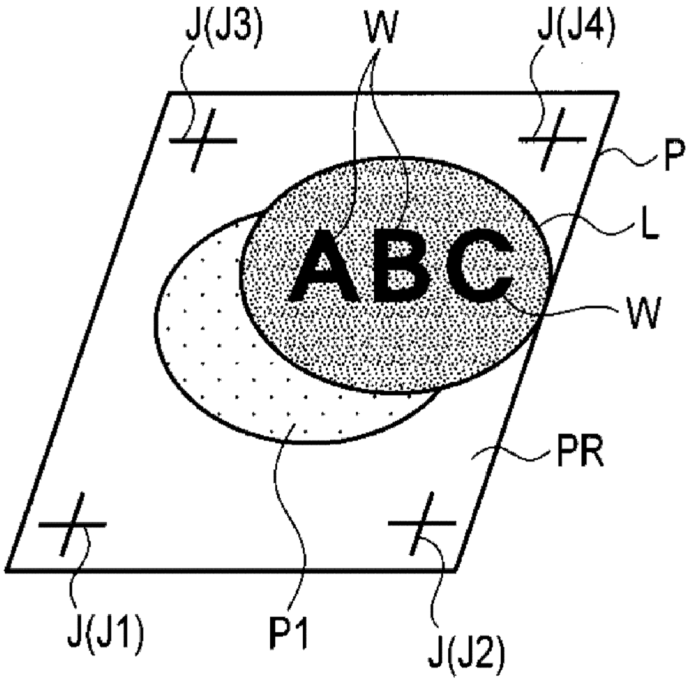
FIG. 14 is an explanatory view illustrating a formed label.
Figure 15:
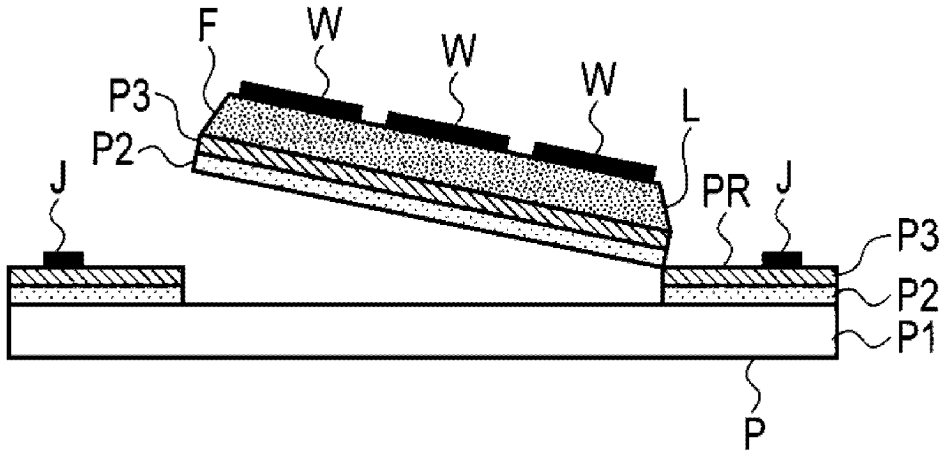
FIG. 15 is a cross-sectional view illustrating the formed label.

The label L can be peeled off from the releasing sheet P1 together with the coating layer P3 and the adhesive material layer P2, as illustrated in FIGS. 14 and 15.

In the above-described label forming apparatus 1 and the label forming method according to the embodiment of the present invention, the position of the film F is stored relative to the positions of the markers J that have been provided at prescribed positions, so that the position of the film F can be detected by detecting the positions of the markers J. Thus, it is possible to accurately form the image layer W on the film F.

In the label forming apparatus 1, it is also possible to detect the expansion and contraction of the base sheet P as well as the degree of inclination of the base sheet P on the same plane of the second transportation belt 62 relative to the transportation direction thereof (i.e., the inclined transportation of the base sheet P) by providing four markers J (J1, J2, J3, and J4). Thus, it is also possible to detect the expansion and contraction of the film F and the degree of inclination of the film F relative to the transportation direction of the second transportation belt 62. Accordingly, the size and the inclination of the image layer W can also be adjusted according to the expansion and contraction of the film F.

The first to third resin powders can be changed in many ways according to the usage of the label. For example, the resins of colors such as yellow (Y), magenta (M), and cyan (C), a transparent resin, a white resin, a fluorescent resin, etc. can be used. Although the resins have been numbered intentionally as the first, second, and third resins in the above-described example, these resins may be made of the same resin powder, or may be made of the same resin powder mixed with different color materials, pigments, or dyes. Naturally, different types of resins can be used.

In adjusting the forming position and the shape of the image layer W as described above, the marker position detector 80 provided in the printer 70 is used to detect the markers J while the second controller 90 detects the change of the position and shape of the film F. The second controller 90 further controls the image layer forming units 71 so that the image layer W can be formed accurately on the detected film F. Accordingly, there is no need to strictly define the positions where the film forming device 20 and the printer 70 are located, and the high mechanical accuracy or rigidity of the entire apparatus is not demanded. It is possible, therefore, to decrease the entire size of the label forming apparatus 1. Meanwhile, the position and the size of the film F can be detected by the marker position detector 80 simply placed above the position where the markers J pass. It is possible, therefore, to simplify the structure of the label forming apparatus 1 without requiring such a detector as to cover the entire surface of the base sheet P.

The label forming apparatus 1 has been described above to include the film forming device 20 integrated with the printer 70, and a series of the flow from forming the image layer W on the film F to providing a finished label is controlled sequentially. Naturally, however, it is also possible, by the controlling method described above related to detection of marker positions, to provide the film forming device 20 and the printer 70 separately by removing the relay transportation mechanism 50. In this case, the film forming device 20 prepares a plurality of base sheets P collectively in advance with the film F and the markers J formed thereon, and the printer 70 subsequently prints the image layers W of these base sheets P collectively to finish the formation of the label.

In the label forming apparatus 1, a feedback control can also be performed with respect to the change from the measurement V11 to the measurement V12, and from the measurement V21 to the measurement V22, by creating a database of detected values obtained every time the detection is carried out. If, for example, any regularity such as an increase of the changing amount from the measurement V11 to the measurement V12 in proportion to the number of times of forming the label L is found, it is possible to predict the subsequent changing amount from the measurement V11 to the measurement V12 to form the label L more accurately.

With the label forming apparatus and the label forming method according to the embodiment of the present invention, it is possible to print designs accurately at predetermined positions on the film without requiring a high mechanical accuracy or rigidity of the entire apparatus.

The present invention is not limited to the above embodiment. For example, the marker forming unit has been placed on the downstream side of the film forming unit in the above-described example. It is also applicable, however, if the marker forming unit is placed on the upstream side of the film forming unit or among a plurality of film forming units.

Further, in the above-described example, the film F has been formed by the first resin powder R and the image layer W has been formed by the third resin powder T. On the contrary, the image layer W may be formed by the first resin powder R and the film F may be formed by the third resin powder T in such a manner as to cover the entire surface of the image layer W. In this case, it is applicable, of course, to the case where the label is attached on the back side of a transparent glass to show the side where the adhesive layer is provided. Alternatively, it is also applicable to the case where the film F is made of a transparent resin so that both sides of the film F are shown.

It is, of course, possible to provide various modifications of embodiments without departing from the scope of the invention.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

The invention claimed is:

1. A label forming apparatus, comprising:

a first pattern forming device; and a second pattern forming device, wherein the first pattern forming device includes a first transportation mechanism configured to transport a base sheet having a print surface thereon, a position storage unit configured to store information of a first pattern forming position based on a prescribed marker position and first pattern data, a first pattern forming unit configured to form a first pattern on the first pattern forming position on the print surface, and a marker forming unit configured to form a marker on the prescribed marker position on the print surface, and the second pattern forming device includes a second transportation mechanism configured to transport the base sheet having the first pattern and the marker formed on the print surface thereof, a marker position detector provided on the downstream side of the first pattern forming unit and the marker forming unit and configured to detect a marker detection position where the marker is formed by the marker forming unit, a second pattern forming unit provided on the downstream side of the marker position detector and configured to form a second pattern on the first pattern, and a controller configured to control the position where the second pattern is formed by the second pattern forming unit, based on a first pattern determination position where the position of the first pattern is determined from the prescribed marker position, the detected marker position detected by the marker position detector and the information of the first pattern forming position.

2. The label forming apparatus according to claim 1, wherein the marker forming unit forms a plurality of markers on the print surface, the marker position detector detects positions of the plurality of markers, and the controller detects the degree of inclination of the first pattern relative to a transportation direction of the second transportation mechanism based on each of the detected marker positions of the plurality of markers detected by the marker position detector.

3. The label forming apparatus according to claim 1, wherein the marker forming unit forms at least a pair of markers formed at a distance from each other in or perpendicular to a transportation direction of the first transportation mechanism, the marker position detector detects the positions of the pair of markers, and the controller compares a distance between the prescribed marker positions of the pair of markers with a distance between the detected marker positions of the pair of markers detected by the marker position detector to detect expansion and contraction of the first pattern in a direction parallel to or perpendicular to a transportation direction of the second transportation mechanism.

4. The label forming apparatus according to claim 2, wherein the marker forming unit forms at least a pair of markers formed at a distance from each other in or perpendicular to a transportation direction of the first transportation mechanism, the marker position detector detects the positions of the pair of markers, and the controller compares a distance between the prescribed marker positions of the pair of markers with a distance between the detected marker positions of the pair of markers detected by the marker position detector to detect expansion and contraction of the first pattern in a direction parallel to or perpendicular to the transportation direction of the second transportation mechanism.

* * * * *